(12) United States Patent
Warganich

(10) Patent No.: US 8,011,324 B1
(45) Date of Patent: Sep. 6, 2011

(54) PET WATERING APPARATUS

(76) Inventor: Daniel Warganich, Placerville, CA (US)

( * ) Notice: Subject to any disclaimer, the term of this patent is extended or adjusted under 35 U.S.C. 154(b) by 0 days.

(21) Appl. No.: 12/925,935

(22) Filed: Nov. 2, 2010

Related U.S. Application Data

(62) Division of application No. 12/070,661, filed on Feb. 19, 2008, now Pat. No. 7,849,817.

(51) Int. Cl.
*A01K 7/00* (2006.01)
(52) U.S. Cl. ............................. 119/77; 119/74
(58) Field of Classification Search .......... 119/248–251, 119/72, 77, 74, 81, 61.54; 222/585
See application file for complete search history.

(56) References Cited

U.S. PATENT DOCUMENTS

| | | | |
|---|---|---|---|
| 169,735 | A | 11/1875 | Schirmer |
| 1,048,344 | A | 12/1912 | Risbon |
| 3,044,209 | A | 7/1962 | Lorenze |
| 3,076,435 | A | 2/1963 | Seymour |
| 4,655,171 | A | 4/1987 | Tomasovich |
| 4,920,362 | A | 4/1990 | Cowger |
| 5,284,173 | A | 2/1994 | Graves et al. |
| 5,297,504 | A | 3/1994 | Carrico |
| 5,791,287 | A | 8/1998 | Gruber |
| 6,019,244 | A | 2/2000 | Jones |
| 6,067,935 | A | 5/2000 | Rodes |
| 6,101,974 | A | 8/2000 | Frohlich |
| 6,142,101 | A | 11/2000 | Pelsor |
| D454,234 | S | 3/2002 | Weterrings |
| D454,990 | S | 3/2002 | Lorenzana |
| 6,463,880 | B1 | 10/2002 | Callingham |
| 6,467,428 | B1 | 10/2002 | Andrisin et al. |
| D497,041 | S | 10/2004 | Plante |
| 7,089,881 | B2 | 8/2006 | Plante |

FOREIGN PATENT DOCUMENTS

JP 2003299419 10/2003

*Primary Examiner* — Kimberly S Smith
(74) *Attorney, Agent, or Firm* — Thomas R. Lampe

(57) ABSTRACT

Apparatus for providing drinking water to an animal includes inner and outer annular walls which define a water supply reservoir. The inner wall forms a draw reservoir that is in communication with the water supply reservoir to replenish water in the draw reservoir and maintain the level of water in said draw reservoir equal to the level of water in said water supply reservoir.

3 Claims, 3 Drawing Sheets

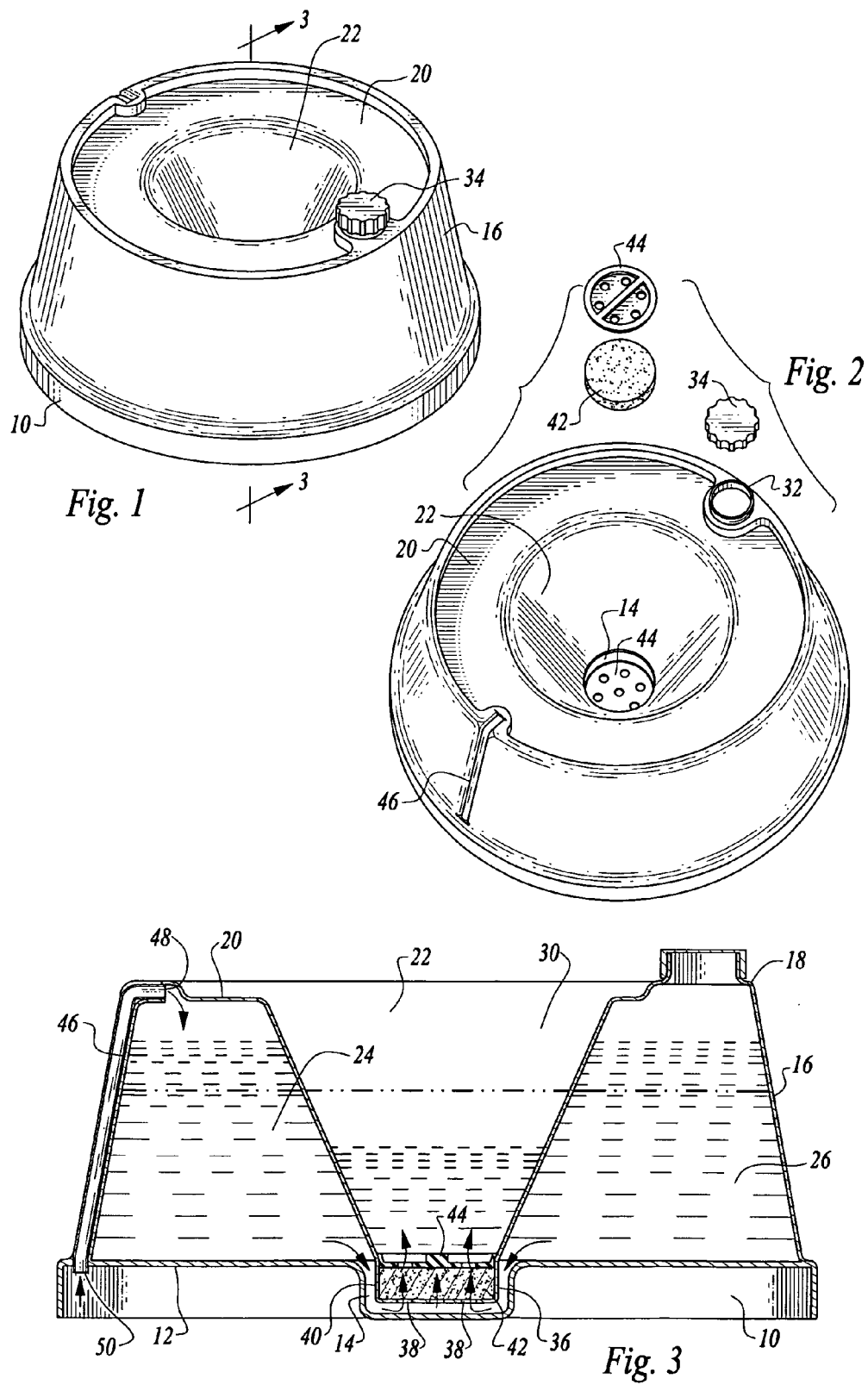

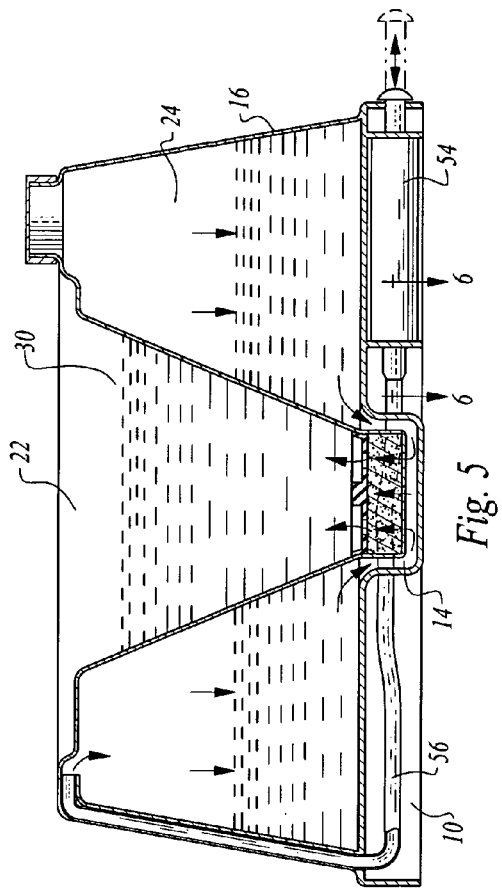
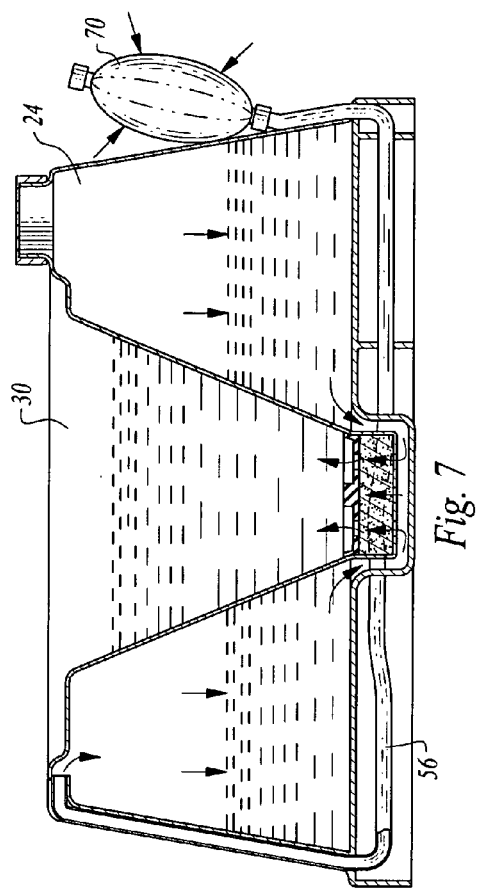
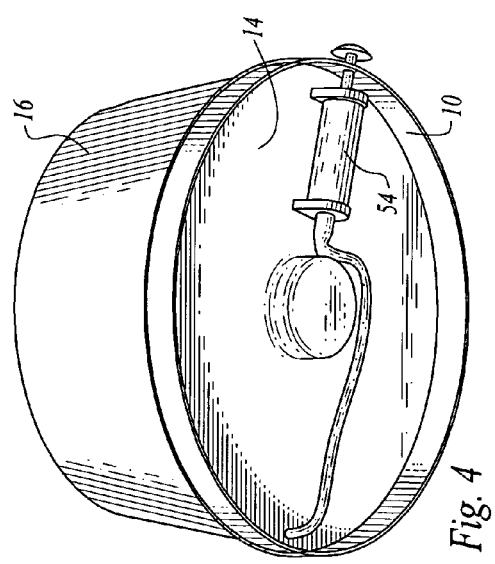
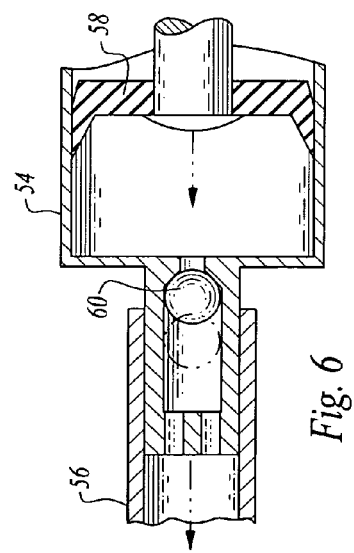

US 8,011,324 B1

PET WATERING APPARATUS

This application is a divisional application based on U.S. patent application Ser. No. 12/070,661, filed Feb. 19, 2008 now U.S. Pat. No. 7,849,817.

TECHNICAL FIELD

This invention relates to apparatus for providing drinking water to an animal which resists spilling and incorporates an integral water reservoir which automatically feeds water into a draw reservoir for access by a dog, cat or other animal.

BACKGROUND OF THE INVENTION

It is generally known to incorporate water reservoirs of various types with bowls to gravity feed water to the bowl to replenish water removed from the bowl due to consumption by an animal, spillage, evaporation, etc. Many such prior art arrangements are relatively large and do not readily lend themselves to use when traveling with a pet. Many such devices also spill all or nearly all of the water in the apparatus when tipped or inverted. Because of the structural configuration and high center of gravity of some of these prior art systems, they are inherently unstable and not suitable, for example, for placement on an uneven surface or use in a moving vehicle. Then too, the structural nature of some prior art systems incorporating a reservoir do not allow complete consumption of water in a water supply reservoir nor provide or maintain other than a minimal amount of water available to an animal.

The following patent publications disclose prior art devices of this nature which are believed to be representative of the current state of the prior art in this field: U.S. Pat. No. 3,076,435, issued Feb. 5, 1963, U.S. Pat. No. 6,467,428, issued Oct. 22, 2002, U.S. Pat. No. 5,791,287, issued Aug. 11, 1998, U.S. Pat. No. 5,284,173, issued Feb. 8, 1994, U.S. Pat. No. 6,067,935, issued May 30, 2000, U.S. Pat. No. 6,101,974, issued Aug. 15, 2000, U.S. Pat. No. 7,089,881, issued Aug. 15, 2006, U.S. Pat. No. 6,463,880, issued Oct. 15, 2002, U.S. Design Pat. No. D454,234, issued Mar. 5, 2002, U.S. Design Pat. No. D454,990, issued Mar. 6, 2002, U.S. Design Pat. No. D497,041, issued Oct. 5, 2004, U.S. Pat. No. 6,142,101, issued November, 2000, U.S. Pat. No. 6,019,244, issued February, 2000, U.S. Pat. No. 4,655,171, issued April, 1987, U.S. Pat. No. 169,735, issued November, 1875, U.S. Pat. No. 1,048,344, issued December, 1912, U.S. Pat. No. 5,297,504, issued March, 1994, U.S. Pat. No. 3,044,209, issued July, 1962, U.S. Pat. No. 4,920,362, issued April, 1990 and Japanese Patent Abstract No. 2003299419, issued Oct. 21, 2003.

DISCLOSURE OF INVENTION

The apparatus of the present invention is characterized by its relative simplicity of construction, portability, and ease of use. The apparatus is splash resistant and substantially completely spill proof even when inverted.

The apparatus has a low center of gravity and is inherently stable, allowing watering even on an unstable surface. The apparatus is self replenishable and incorporates features which result in virtually complete use of water stored therein.

A unique air venting arrangement is disclosed which vents air out of the apparatus while filling the apparatus with water and vents air into the apparatus when water is being drawn therefrom during drinking by an animal. Water being drunk is continually replenished and water is constantly available to an animal at the highest possible water level until the apparatus has been emptied.

The apparatus includes a support for positioning on a surface. A bottom wall is supported by the support and includes a bottom wall portion defining a downwardly extending recess.

A continuous outer wall extends upwardly from the bottom wall and has an upper end.

A continuous inner wall is connected to the upper end of the outer wall and extends downwardly therefrom. The inner wall is spaced inwardly of the outer wall.

The inner wall, the outer wall and the bottom wall define a water supply reservoir surrounding said inner wall.

The inner wall forms a draw reservoir and has a lower end extending into the recess defining an opening located in the recess in fluid-flow communication with the draw reservoir. The bottom wall and the inner wall define a water flow path leading from the water supply reservoir to the draw reservoir.

In one embodiment of the invention, an air pump is provided for creating pressurized air in the water supply reservoir exerting downward pressure on water in the water supply reservoir to increase flow of water from the water supply reservoir through the water flow path into the draw reservoir through the opening.

Other features, advantages and objects of the present invention will become apparent with reference to the following description and accompanying drawings.

BRIEF DESCRIPTION OF DRAWINGS

FIG. 1 is a perspective view of a first embodiment of apparatus constructed in accordance with the teachings of the present invention;

FIG. 2 is an exploded, perspective view illustrating components of the apparatus of FIG. 1;

FIG. 3 is an enlarged, cross-sectional view taken along line 3-3 of FIG. 1 and illustrating water and air flow within the interior thereof by arrows;

FIG. 4 is a bottom, perspective view of a second embodiment of the apparatus;

FIG. 5 is a cross-sectional view similar to FIG. 3 but of the second embodiment of the apparatus;

FIG. 6 is a greatly enlarged cross-sectional view taken along the line 6-6 of FIG. 5;

FIG. 7 is a cross-sectional view similar to FIGS. 3 and 5, but illustrating a third embodiment of the apparatus;

MODES FOR CARRYING OUT THE INVENTION

Figure 8:
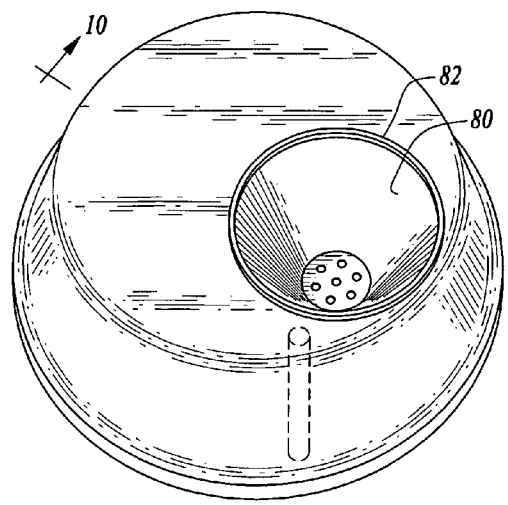
FIG. 8 is a top, perspective view of a fourth embodiment of the apparatus.

Referring now to FIGS. 1-3, apparatus constructed in accordance with the teachings of the present invention for providing drinking water to an animal includes a circular support 10 for positioning on a surface, such as a floor (not shown). A bottom wall 12 is supported by the support 10, the support being essentially planar in nature except for a downwardly extending recess 14 defined by a portion thereof.

A continuous, annular outer wall 16 extends upwardly from the bottom wall and has an upper end 18. A continuous, annular top wall 20 extends inwardly from the upper end 18.

A continuous, annular inner wall 22 is connected to the upper end 18 of the outer wall 16 by top wall 20.

The annular inner wall has an inverted, generally truncated cone shape and extends downwardly from the top wall and upper end 18 of the outer wall. In the arrangement illustrated, the support 10, the bottom wall 12, the outer wall 16, the top wall 20 and the inner wall 22 are of integral construction and may be suitably formed of flexible plastic material which may be collapsed to form an even more compact configuration further adapting the apparatus for transport and storage.

The inner wall, the outer wall and the bottom wall define an annular shaped water supply reservoir 24 completely surrounding the inner wall. FIG. 3 illustrates water 26 in the water supply reservoir as well as in the interior of inner wall 22, the inner wall forming a draw reservoir 30. A water fill port 32 communicates with the water supply reservoir 24, a closure cap 34 being utilized to close the water fill port.

The lower end 36 of the inner wall extends into recess 14. The lower end 36 has a plurality of openings 38 located in the recess in fluid-flow communication with the draw reservoir 30. The bottom wall 12 and the inner wall define a water flow path leading from the water supply reservoir to the draw reservoir. A portion of this water flow path is the annular space 40 surrounding the lower end of the inner wall. FIG. 3 illustrates by arrows the movement of water through the annular space 40 and upwardly into the draw reservoir when the water in the draw reservoir has been depleted, for example by a pet drinking the water. In the arrangement illustrated, a water filter 42 of any suitable type is disposed above openings 38. A removable cap 44 having holes therein maintains the water filter in position but may be removed when desired to obtain access to the water filter for cleaning or replacement.

Positioning of the lower end 36 in recess 14 places openings 38 below the level of surrounding bottom wall 12 of the annular water supply reservoir, ensuring that the water supply reservoir can be virtually completely emptied during use. A venting conduit 46 is positioned in a groove formed in outer wall 16. The conduit has an open upper end 48 and an open lower end 50. The upper end 48 communicates with the water supply reservoir adjacent to the upper end of the outer wall. The lower end 50 is located externally of and below that portion of the bottom wall not defining the recess 14. As water moves from the water supply reservoir to the draw reservoir, ambient air flows into open lower end 50 and out of open upper end 48 into the water supply reservoir, providing venting. This ensures that water from the water supply reservoir readily flows into the draw reservoir to constantly maintain the water in the draw reservoir at the highest possible level. In addition, the conduit vents air from the water supply reservoir when the apparatus is refilled with water. The air supply conduit may be flexible and collapsible.

It will be appreciated that the apparatus has a low center of gravity, making it extremely stable. Furthermore, the apparatus is virtually spill proof and splash resistant when tilted or inverted (the water in the draw reservoir excepted).

FIGS. 4-6 illustrate a second embodiment of the invention. This embodiment incorporates features common with those of the FIGS. 1-3 embodiment and these are identified by like numerals.

The second embodiment differs from the first embodiment in that an air pump 54 is located under the bottom wall. The air supply conduit 56 is connected to the air output end of the air pump. A plunger 58 of the air pump can be manually moved back and forth by an attached handle as indicated by the double headed arrow in FIG. 5 to pump air through air supply conduit 58 into the upper portion of the water supply reservoir 24, creating air pressure therein which forces water in the water supply reservoir downwardly as illustrated by the arrows. This can be used to raise the level of water in the draw reservoir 30 higher than that of the water in the supply reservoir. A ball valve 60 associated with the air pump 54 acts as a one-way valve preventing the pressurized air from returning into the air pump cylinder.

FIG. 7 discloses a third embodiment of the apparatus wherein a squeeze bulb 70 is utilized to deliver pressurized air through the air supply conduit 56 into the water supply reservoir. It will appreciated that a one-way valve (not shown) is also associated with the squeeze bulb 70.

Figure 9:
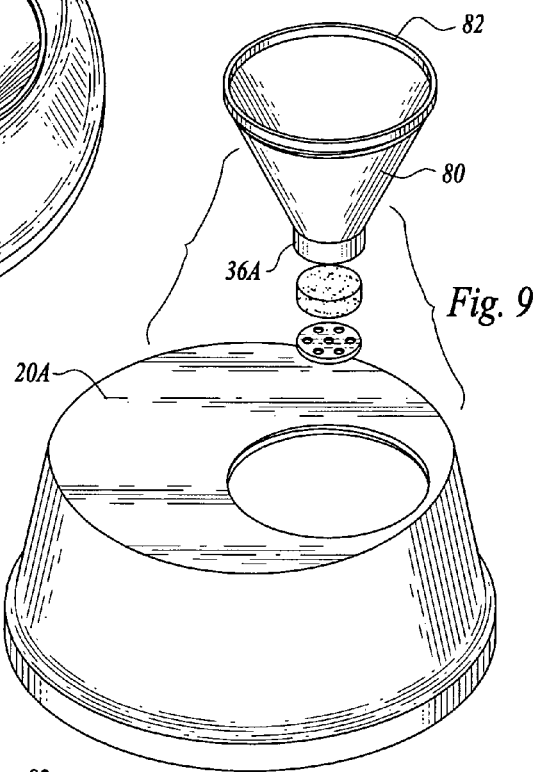
FIG. 9 is an exploded, perspective view of components of the fourth embodiment.
Figure 11:
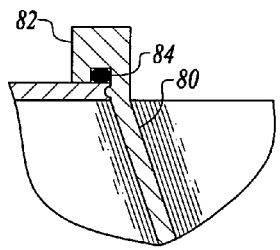
FIG. 11 is a greatly enlarged, cross-sectional view taken along that portion of the apparatus delineated by arrows 11-11 of FIG. 10.
Figure 10:
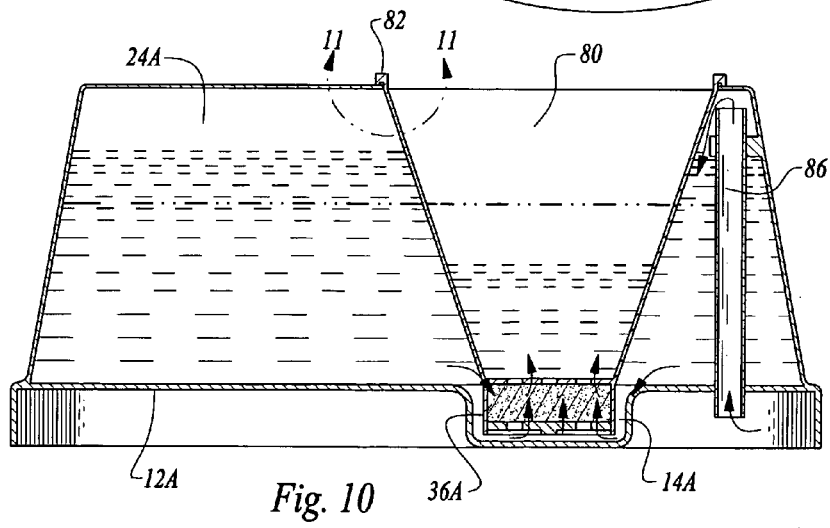
FIG. 10 is an enlarged, cross-sectional view taken along the line 10-10 of FIG. 8.

FIGS. 8-11 illustrate a fourth embodiment of the invention in which a recess 14A defined by the bottom wall 12A is offset from center. In addition, the inner wall 80 is displaced from center and removably connected to the rest of the apparatus. In particular, the upper end of inner wall 80 has an outwardly projecting flange 82 which accommodates therein an annular seal 84. When the inner wall is in position, the flange 82 engages top wall 20A and the top wall supports the inner wall with the lower end 36A thereof positioned in recess 14A.

In this fourth embodiment, the air supply conduit 86 is disposed internally of the water supply reservoir 24A. This embodiment has no air pump and the air supply conduit 86 merely acts as a vent pipe for replenishing air in the draw reservoir defined by inner wall 80 therein as water lowers. As with the other embodiments described above, basically the only spillage that can occur even upon complete inversion of the apparatus will be from the draw reservoir.

The invention claimed is:

1. Apparatus for providing drinking water to an animal, said apparatus comprising, in combination:

a support defining a support interior, said support for positioning on a surface;

a bottom wall supported by said support and including a first bottom wall portion having a cylindrically-shaped peripheral wall and closed bottom end defining a downwardly extending recess, said first bottom wall portion extending into said support interior and said bottom wall further including a second bottom wall portion surrounding said first bottom wall portion and elevated relative to said closed bottom end;

a continuous outer wall surrounding said bottom wall extending upwardly from said bottom wall and having an upper end;

a continuous top wall;

a continuous inner wall connected to the upper end of said outer wall by said top wall and extending downwardly from said top wall, said inner wall spaced inwardly of said outer wall, and said inner wall, said top wall, said outer wall and said bottom wall defining a water supply reservoir surrounding said inner wall, said inner wall forming a draw reservoir and having a lower end including a cylindrically-shaped side wall and bottom having an outer periphery terminating at said cylindrically-shaped side wall extending into said recess, said bottom defining at least one bottom opening located in said recess in fluid flow communication with said draw reservoir, said first bottom wall portion and the lower end of said inner wall being completely spaced from one another and defining a continuous water flow path extending completely about and along the lower end of said inner wall and under said bottom leading from said water supply reservoir and under and through said at least one opening to said draw reservoir; and an air conduit fixed in position relative to the water supply reservoir having an upper segment extending substantially the full height of said water supply reservoir with the open upper end thereof within said water supply reservoir closely adjacent to and under said top wall and a lower segment including a lower end and disposed below and externally of said bottom wall, the configuration and positioning of said air conduit relative to said water supply reservoir preventing water in said water supply reservoir from draining through said air conduit when said apparatus is upright and also when said apparatus is inverted and upside down, said inner wall selectively releasably connected to said top wall and supported by said top wall.

2. The apparatus according to claim 1 additionally comprising an annular seal between said inner wall and said top wall.

3. Apparatus for providing drinking water to an animal, said apparatus comprising, in combination:
- a support defining a support interior, said support for positioning on a surface;
- a bottom wall supported by said support and including a first bottom wall portion having a cylindrically-shaped peripheral wall and closed bottom end defining a downwardly extending recess, said first bottom wall portion extending into said support interior and said bottom wall further including a second bottom wall portion surrounding said first bottom wall portion and elevated relative to said closed bottom end;
- a continuous outer wall surrounding said bottom wall extending upwardly from said bottom wall and having an upper end;
- a continuous top wall;
- a continuous inner wall connected to the upper end of said outer wall by said top wall and extending downwardly from said top wall, said inner wall spaced inwardly of said outer wall, and said inner wall, said top wall, said outer wall and said bottom wall defining a water supply reservoir surrounding said inner wall, said inner wall forming a draw reservoir and having a lower end including a cylindrically-shaped side wall and bottom having an outer periphery terminating at said cylindrically-shaped side wall extending into said recess, said bottom defining at least one bottom opening located in said recess in fluid flow communication with said draw reservoir, said first bottom wall portion and the lower end of said inner wall being completely spaced from one another and defining a continuous water flow path extending completely about and along the lower end of said inner wall and under said bottom leading from said water supply reservoir and under and through said at least one opening to said draw reservoir; and
- an air conduit fixed in position relative to the water supply reservoir having an upper segment extending substantially the full height of said water supply reservoir with the open upper end thereof within said water supply reservoir closely adjacent to and under said top wall and a lower segment including a lower end and disposed below and externally of said bottom wall, the configuration and positioning of said air conduit relative to said water supply reservoir preventing water in said water supply reservoir from draining through said air conduit when said apparatus is upright and also when said apparatus is inverted and upside down, said air conduit comprising an air vent conduit for venting air into said water supply reservoir responsive to lowering of the water level in said water supply reservoir and venting air out of said water supply reservoir.

* * * * *